(12) United States Patent  
Sun

(10) Patent No.: US 11,113,500 B2
(45) Date of Patent: Sep. 7, 2021

(54) FINGERPRINT IDENTIFICATION DEVICE, FINGERPRINT IDENTIFICATION MODULE AND CONTROL METHOD OF FINGERPRINT IDENTIFICATION DEVICE

(71) Applicant: Acer Incorporated, New Taipei (TW)

(72) Inventor: Chia-Yu Sun, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/808,546

(22) Filed: Mar. 4, 2020

(65) Prior Publication Data

US 2021/0027034 A1    Jan. 28, 2021

(30) Foreign Application Priority Data

Jul. 24, 2019 (TW) .................................. 108126112

(51) Int. Cl.
*G06K 9/00* (2006.01)
*G06F 3/041* (2006.01)
*G06F 3/044* (2006.01)

(52) U.S. Cl.
CPC ......... *G06K 9/0002* (2013.01); *G06F 3/0447* (2019.05); *G06F 3/04144* (2019.05); *G06K 9/00087* (2013.01)

(58) Field of Classification Search
CPC .............. G06K 9/0002; G06K 9/00087; G06F 3/04144; G06F 3/0447
See application file for complete search history.

(56) References Cited

U.S. PATENT DOCUMENTS

| 9,342,733 B2 | 5/2016 | Lee et al. |
| 10,564,785 B2 | 2/2020 | Hu |
| 2005/0110103 A1 | 5/2005 | Setlak |
| 2009/0161920 A1* | 6/2009 | Kan .................... G06K 9/0004 382/115 |

(Continued)

FOREIGN PATENT DOCUMENTS

| TW | 201627918 A | 8/2016 |
| TW | 201719499 A | 6/2017 |
| TW | 201901392 A | 1/2019 |

OTHER PUBLICATIONS

Chinese language office action dated Apr. 29, 2020, issued in application No. TW 108126112.

*Primary Examiner* — Stephen G Sherman
(74) *Attorney, Agent, or Firm* — McClure, Qualey & Rodack, LLP

(57) ABSTRACT

A fingerprint identification device is provided and includes a substrate, a fingerprint identification sensing component, a first driving assembly, and a control circuit. The fingerprint identification sensing component is disposed on the substrate and configured to receive fingerprint information about a finger of a user. The first driving assembly is disposed on the substrate. The control circuit is configured to transmit a control signal to the first driving assembly. When the finger is placed on the fingerprint identification device, the first driving assembly is configured to deform according to the control signal to drive the fingerprint identification sensing component so that the fingerprint identification sensing component is sequentially moved relative to the substrate in different directions.

14 Claims, 11 Drawing Sheets

(56) References Cited

U.S. PATENT DOCUMENTS

2009/0232362 A1* 9/2009 Otsubo ............... G06K 9/0004
382/115
2011/0260966 A1* 10/2011 Okazaki ............ G06K 9/00026
345/156

* cited by examiner

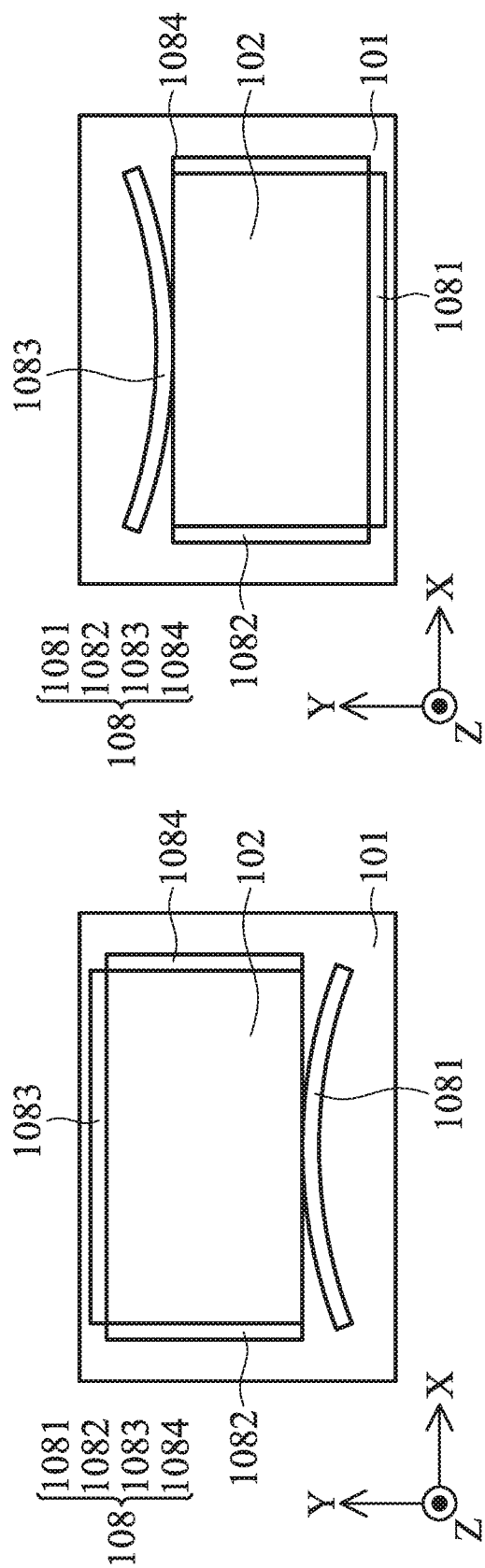
FIG. 4A
FIG. 4B
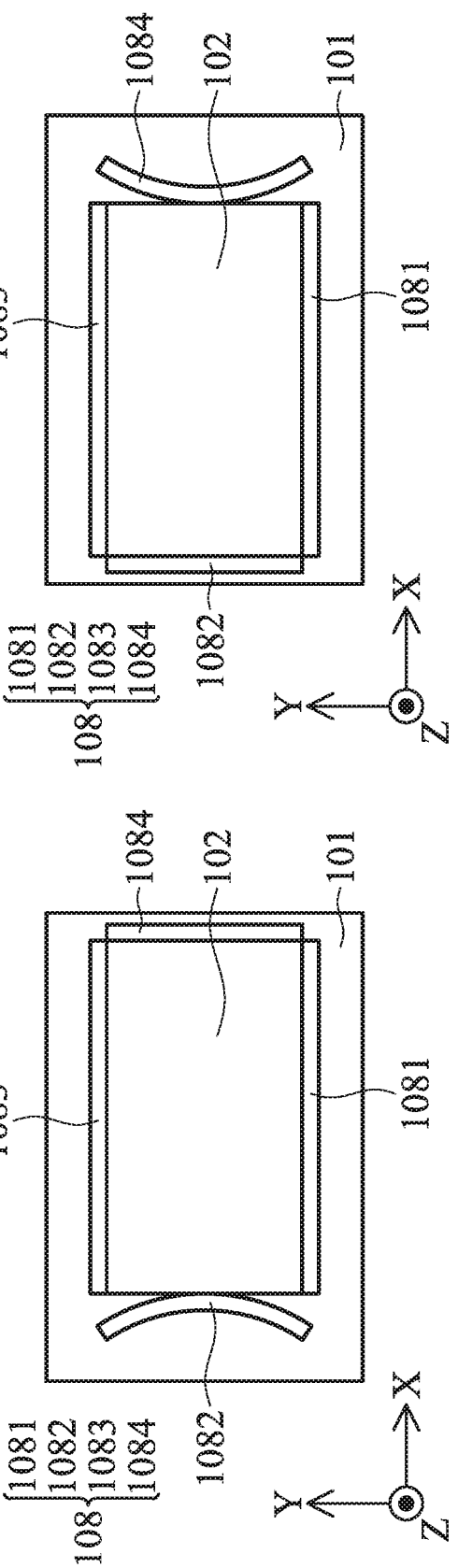
FIG. 4C
FIG. 4D

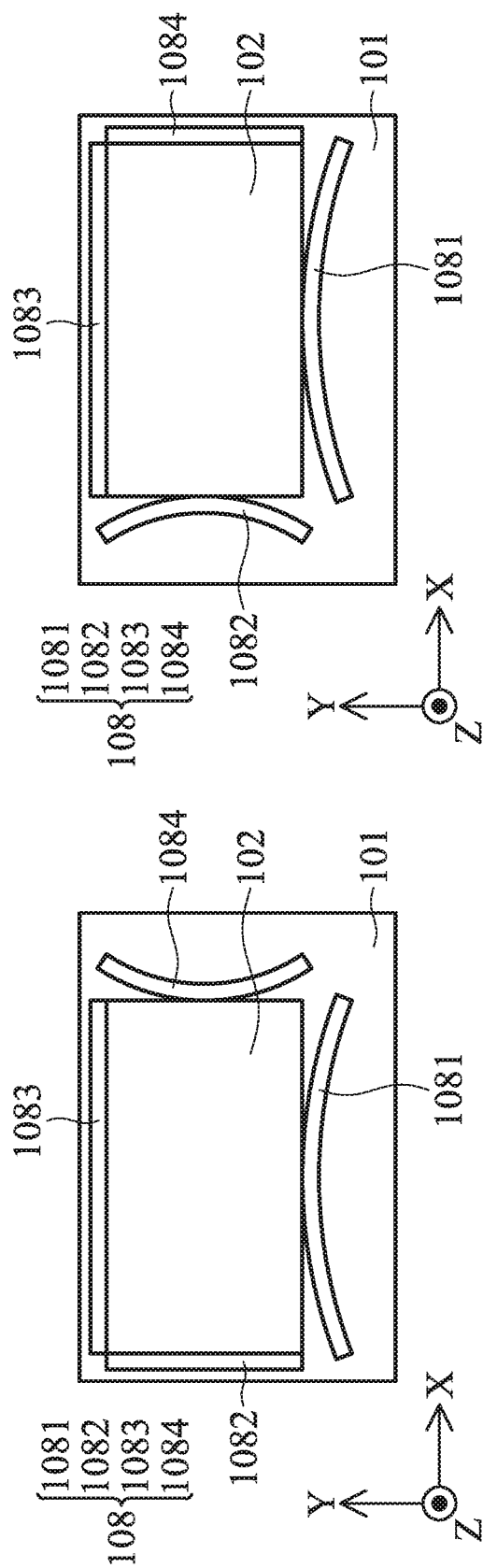
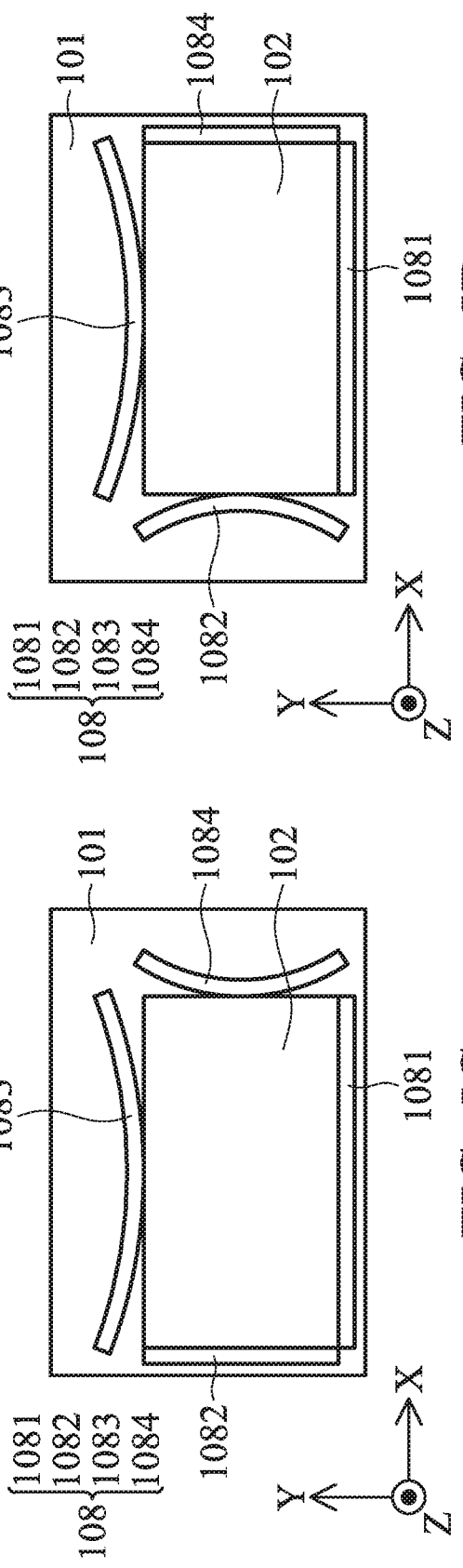
FIG. 5A  FIG. 5B
FIG. 5C  FIG. 5D

FINGERPRINT IDENTIFICATION DEVICE, FINGERPRINT IDENTIFICATION MODULE AND CONTROL METHOD OF FINGERPRINT IDENTIFICATION DEVICE

CROSS REFERENCE TO RELATED APPLICATIONS

This application claims the benefit of TW Patent Application No. 108126112, filed Jul. 24, 2019, the entirety of which is incorporated by reference herein.

BACKGROUND OF THE DISCLOSURE

Field of the Disclosure

The present disclosure relates to a fingerprint identification device, and in particular it relates to a fingerprint identification device using piezoelectric material to increase the amount and quality of fingerprint information.

Description of the Related Art

As technology has developed, many of today's electronic devices (such as tablet computers and smartphones) now have fingerprint-identification functionality. The user can place his or her finger on the fingerprint sensor to perform fingerprint registration or to unlock the device via the fingerprint. Due to the convenience of fingerprint registration and unlocking, electronic devices with fingerprint scanners are gradually becoming popular among the public.

In general, the area of a fingerprint sensor is usually smaller than the user's finger, so the application must capture segments of the fingerprint and stitch them during the registration process. However, such existing fingerprint registration methods do not meet further requirements for fingerprint scanners, such as faster registration, increased authentication reliability, and the like.

Therefore, how to design a fingerprint identification device that can meet the various needs of users are topics nowadays that need to be discussed and solved.

BRIEF SUMMARY OF THE DISCLOSURE

Accordingly, one objective of the present disclosure is to provide a fingerprint identification device to solve the above problems.

According to some embodiments of the disclosure, a fingerprint identification device is provided and includes a substrate, a fingerprint identification sensing component, a first driving assembly, and a control circuit. The fingerprint identification sensing component is disposed on the substrate and configured to receive fingerprint information about a finger of a user. The first driving assembly is disposed on the substrate. The control circuit is configured to transmit a control signal to the first driving assembly. When the finger is placed on the fingerprint identification device, the first driving assembly is configured to deform according to the control signal to drive the fingerprint identification sensing component so that the fingerprint identification sensing component is sequentially moved relative to the substrate in different directions.

According to some embodiments, a fingerprint identification module is provided and includes a substrate, a fingerprint identification sensing component, and a driving assembly. The fingerprint identification sensing component is disposed on the substrate and configured to receive fingerprint information about a finger of a user. The driving assembly is disposed on the substrate. When the finger is placed on the fingerprint identification module, the driving assembly is configured to deform according to a control signal to drive the fingerprint identification sensing component so that the fingerprint identification sensing component is sequentially moved relative to the substrate in different directions.

According to some embodiments, a control method of a fingerprint identification device is provided and includes the following steps: when a user's a finger is placed on the fingerprint identification device, receiving, by a fingerprint identification sensing component, fingerprint information about the finger, wherein the fingerprint identification sensing component is in an initial position; outputting, by a control circuit, a control signal to a driving assembly; driving, by the driving assembly, the fingerprint identification sensing component to sequentially move relative to the initial position according to the control signal; and receiving, by the fingerprint identification sensing component, other pieces of fingerprint information about the finger when the fingerprint identification sensing component sequentially moves relative to the initial position.

The present disclosure provides a fingerprint identification device including at least one driving assembly (the first driving assembly and the second driving assembly) which respectively includes a plurality of driving elements (such as the first and second driving elements), and the driving element can be a piezoelectric element. When the driving element receives the voltage signal, the driving element can drive the fingerprint identification sensing component to move relative to an initial position, and at the same time, the fingerprint identification sensing component can capture the fingerprint information of the user during said movement.

Based on the design of the present disclosure, the fingerprint identification device can increase the detected fingerprint area, such as the portion of fingerprint on the side of the finger, thereby improving the reliability of the authentication. In addition, the user can complete fingerprint registration in one touch, rather than multiple touches, thereby greatly reducing the time it takes to register a fingerprint.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 4A to FIG. 4D are diagrams illustrating that the first driving elements drive the fingerprint identification sensing component 102 to move relative to the substrate 101 according to an embodiment of the present disclosure.

FIG. 5A to FIG. 5D are diagrams illustrating that the first driving elements drive the fingerprint identification sensing component 102 to move relative to the substrate 101 according to an embodiment of the present disclosure.

DETAILED DESCRIPTION OF THE ILLUSTRATIVE EMBODIMENTS

Figure 1:
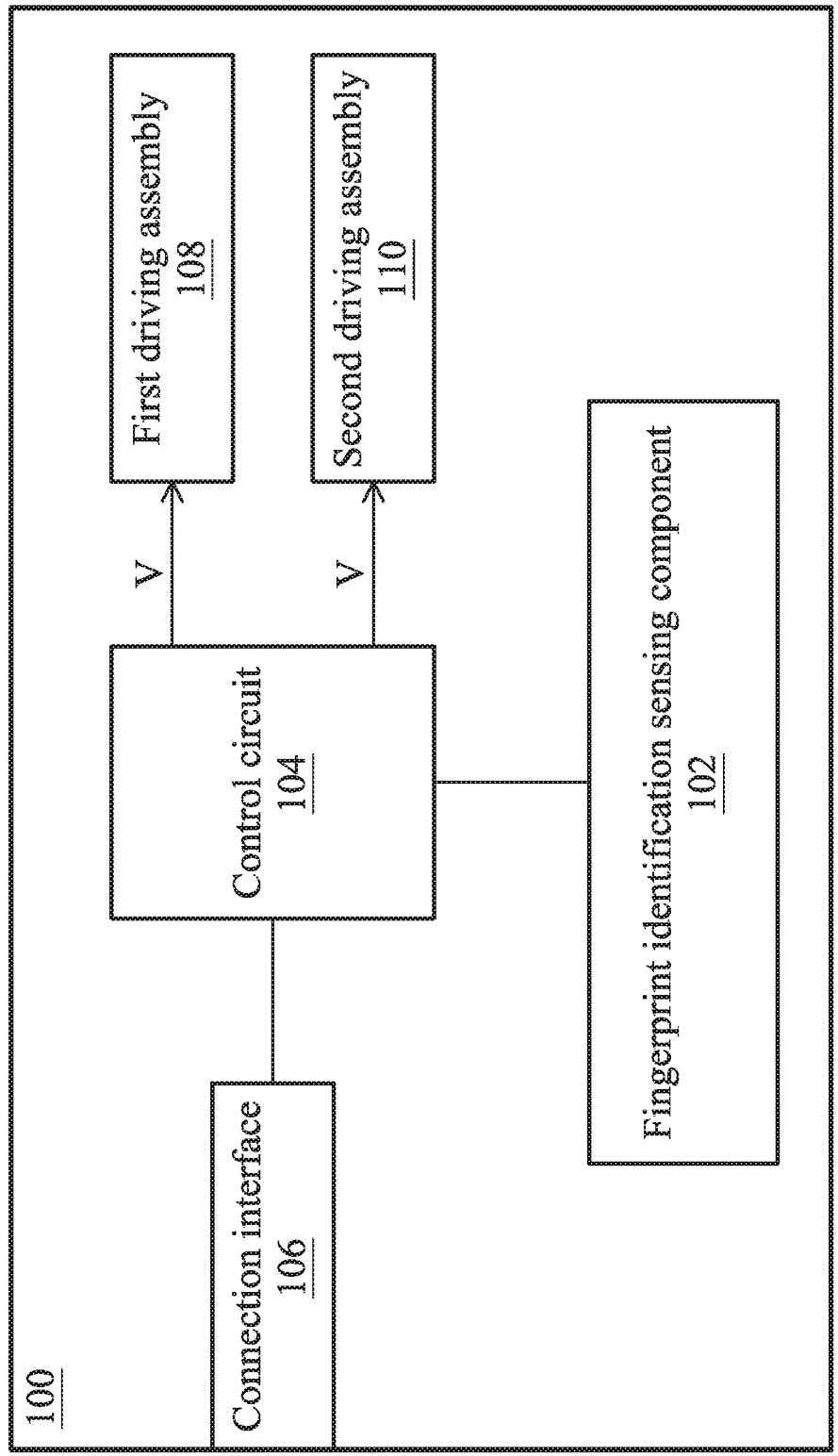
FIG. 1 is a block diagram of a fingerprint identification device 100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

The terms "first", "second", "third", "fourth", and the like are merely generic identifiers and, as such, may be interchanged in various embodiments. For example, while an element may be referred to as a "first" element in some embodiments, the element may be referred to as a "second" element in other embodiments.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Figure 2:
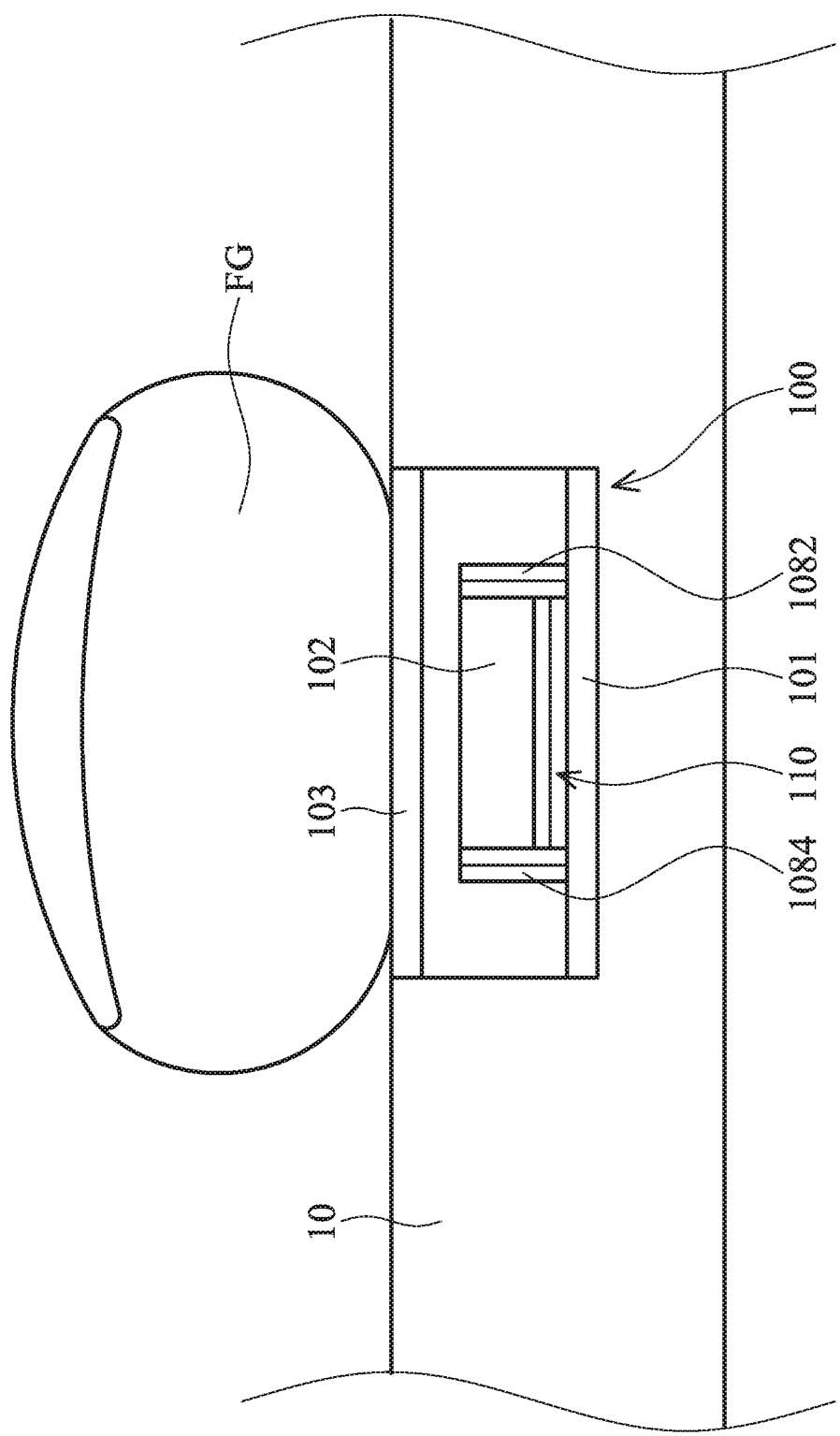
FIG. 2 is a side view of a user's finger FG placed on the fingerprint identification device 100 according to an embodiment of the present disclosure.
Figure 3:
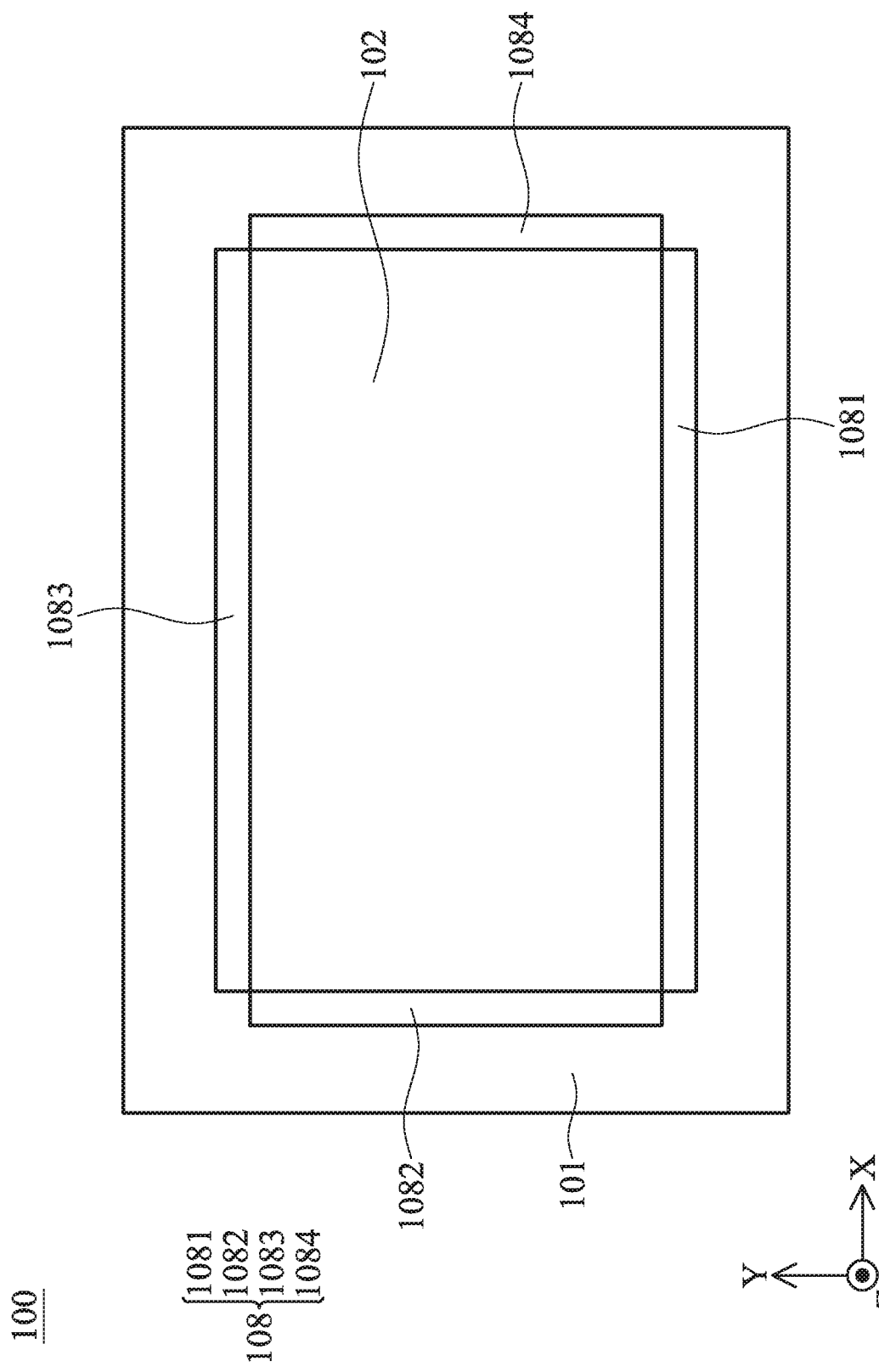
FIG. 3 is a top view of the fingerprint identification device 100 according to an embodiment of the present disclosure.

Please refer to FIG. 1 to FIG. 3. FIG. 1 is a block diagram of a fingerprint identification device 100 according to an embodiment of the present disclosure. FIG. 2 is a side view of a user's finger FG placed on the fingerprint identification device 100 according to an embodiment of the present disclosure. FIG. 3 is a top view of the fingerprint identification device 100 according to an embodiment of the present disclosure. The fingerprint identification device 100 of the present disclosure may be installed on an electronic device (for example, a notebook computer or a smart phone). As shown in FIG. 2, the fingerprint identification device 100 is installed on a notebook computer 10.

As shown in FIG. 1 to FIG. 3, the fingerprint identification device 100 may include a fingerprint identification module and a control circuit 104. The fingerprint identification module includes a substrate 101, a fingerprint identification sensing component 102, a cover 103, a connection interface 106, a first driving assembly 108 and a second driving assembly 110. The cover 103 is located on the top side of the fingerprint identification device 100, and the cover 103 may be made of a transparent material. The fingerprint identification sensing component 102 is disposed on the substrate 101 and is configured to receive fingerprint information when the user's finger FG is placed on the cover 103.

Furthermore, the fingerprint identification sensing component 102 may have a rectangular structure, and the first driving assembly 108 and the second driving assembly 110 are disposed on the substrate 101 corresponding to four sides of the fingerprint identification sensing component 102. The control circuit 104 is configured to transmit a control signal (such as a voltage signal V) to the first driving assembly 108 and/or the second driving assembly 110, and the first driving assembly 108 and the second driving assembly 110 may include a plurality of piezoelectric elements (for example, multilayer piezoelectric ceramic elements).

For example, when the user's finger FG is placed on the fingerprint identification device 100, the first driving assembly 108 and the second driving assembly 110 are configured to deform according to the control signal, thereby driving the fingerprint identification sensing component 102, so that the fingerprint identification sensing component 102 moves relative to the substrate 101 in different directions, so as to obtain more fingerprint features (the fingerprint information) of the finger FG. Details of the movement of the fingerprint identification sensing component 102 will be described later.

Then, the control circuit 104 transmits the obtained fingerprint information to a processing circuit (not shown) of the notebook computer 10 through the connection interface 106 to perform a subsequent process, such as to execute a program for registering the user's fingerprint.

Please continue to refer to FIG. 1 to FIG. 3. As shown in FIG. 3, the first driving assembly 108 can include at least four first driving elements (for example, the foregoing multilayer piezoelectric ceramic elements) that respectively contact the four sides of the fingerprint identification sensing component 102. The first driving element 1081 and the first driving element 1083 are respectively in contact with the upper and lower sides of the fingerprint identification sensing component 102, and the first driving element 1082 and the first driving element 1084 are respectively in contact with the left and right sides of the fingerprint identification sensing component 102. It should be noted that the number of first driving elements is not limited to this embodiment.

It should be noted that the sizes of the first driving elements correspond to the lengths of the respective sides of the fingerprint identification sensing component 102. For example, the lengths of the first driving elements are the same as the lengths of the sides. In addition, each of the first driving elements has a first surface and a second surface, the first surface is in contact with the fingerprint identification sensing component 102, and the second surface is away from the fingerprint identification sensing component 102. When the first driving element receives the control signal, the first side is deformed to push the fingerprint identification sensing component 102 to move.

Next, please refer to FIG. 3, FIG. 4A to FIG. 4D together. FIG. 4A to FIG. 4D are diagrams illustrating that the first driving elements drive the fingerprint identification sensing component 102 to move relative to the substrate 101 according to an embodiment of the present disclosure. The control circuit 104 is configured to control one of the first driving elements to drive the fingerprint identification sensing component 102 to move in the X-axis (a first axis) or the Y-axis (a second axis) relative to the substrate 101. As shown in FIG. 3, when the control circuit 104 does not provide a control signal to the first driving assembly 108, the fingerprint identification sensing component 102 is located in an initial position. Then, when the control circuit 104 provides a control signal (the voltage signal V) to the first driving element 1081, the first driving element 1081 is deformed to push the fingerprint identification sensing component 102 to move upward along the Y-axis relative to the initial position.

Similarly, as shown in FIG. 4B, the first driving element 1083 is deformed after receiving the voltage signal V to push the fingerprint identification sensing component 102 to move downward along the −Y-axis relative to the initial position. As shown in FIG. 4C, the first driving element 1082 is deformed after receiving the voltage signal V to push the fingerprint identification sensing component 102 to move rightward along the X-axis relative to the initial position. As shown in FIG. 4D, the first driving element 1084 is deformed after receiving the voltage signal V to push the fingerprint identification sensing component 102 to move leftward along the −X-axis relative to the initial position.

The relationship between the direction of motion of the fingerprint identification sensing component 102 relative to the initial position and the voltage applied to the first driving elements 1081 to 1084 can be referenced in Table 1 below.

TABLE 1

|  | upward | rightward | downward | leftward |
|---|---|---|---|---|
| first driving element 1081 | voltage signal V | 0 | 0 | 0 |
| first driving element 1082 | 0 | voltage signal V | 0 | 0 |
| first driving element 1083 | 0 | 0 | voltage signal V | 0 |
| first driving element 1084 | 0 | 0 | 0 | voltage signal V |

Furthermore, please refer to FIG. 5A to FIG. 5D. FIG. 5A to FIG. 5D are diagrams illustrating that the first driving elements drive the fingerprint identification sensing component 102 to move relative to the substrate 101 according to an embodiment of the present disclosure. In this embodiment, the control circuit 104 can control two of the first driving elements to drive the fingerprint identification sensing component 102 to move relative to the substrate 101 along the X-axis and the Y-axis. As shown in FIG. 5A, when the control circuit 104 provides the voltage signal V to the first driving element 1081 and the first driving element 1084, the first driving element 1081 and the first driving element 1084 are deformed to push the fingerprint identification sensing component 102 to move to the upper left relative to the initial position.

Similarly, as shown in FIG. 5B, the first driving element 1081 and the first driving element 1082 are deformed after receiving the voltage signal V to push the fingerprint identification sensing component 102 to move to the upper right relative to the initial position. As shown in FIG. 5C, the first driving element 1083 and the first driving element 1084 are deformed after receiving the voltage signal V to push the fingerprint identification sensing component 102 to move to the lower left relative to the initial position. As shown in FIG. 5D, the first driving element 1082 and the first driving element 1083 are deformed after receiving the voltage signal V to push the fingerprint identification sensing component 102 to move to the lower right relative to the initial position.

The relationship between the direction of motion of the fingerprint identification sensing component 102 relative to the initial position and the voltage applied to the first driving elements 1081 to 1084 can be referenced in Table 2 below.

TABLE 2

|  | to the upper left | to the upper right | to the lower left | to the lower right |
|---|---|---|---|---|
| first driving element 1081 | voltage signal V | voltage signal V | 0 | 0 |
| first driving element 1082 | 0 | voltage signal V | 0 | voltage signal V |
| first driving element 1083 | 0 | 0 | voltage signal V | voltage signal V |
| first driving element 1084 | voltage signal V | 0 | voltage signal V | 0 |

Figure 6:
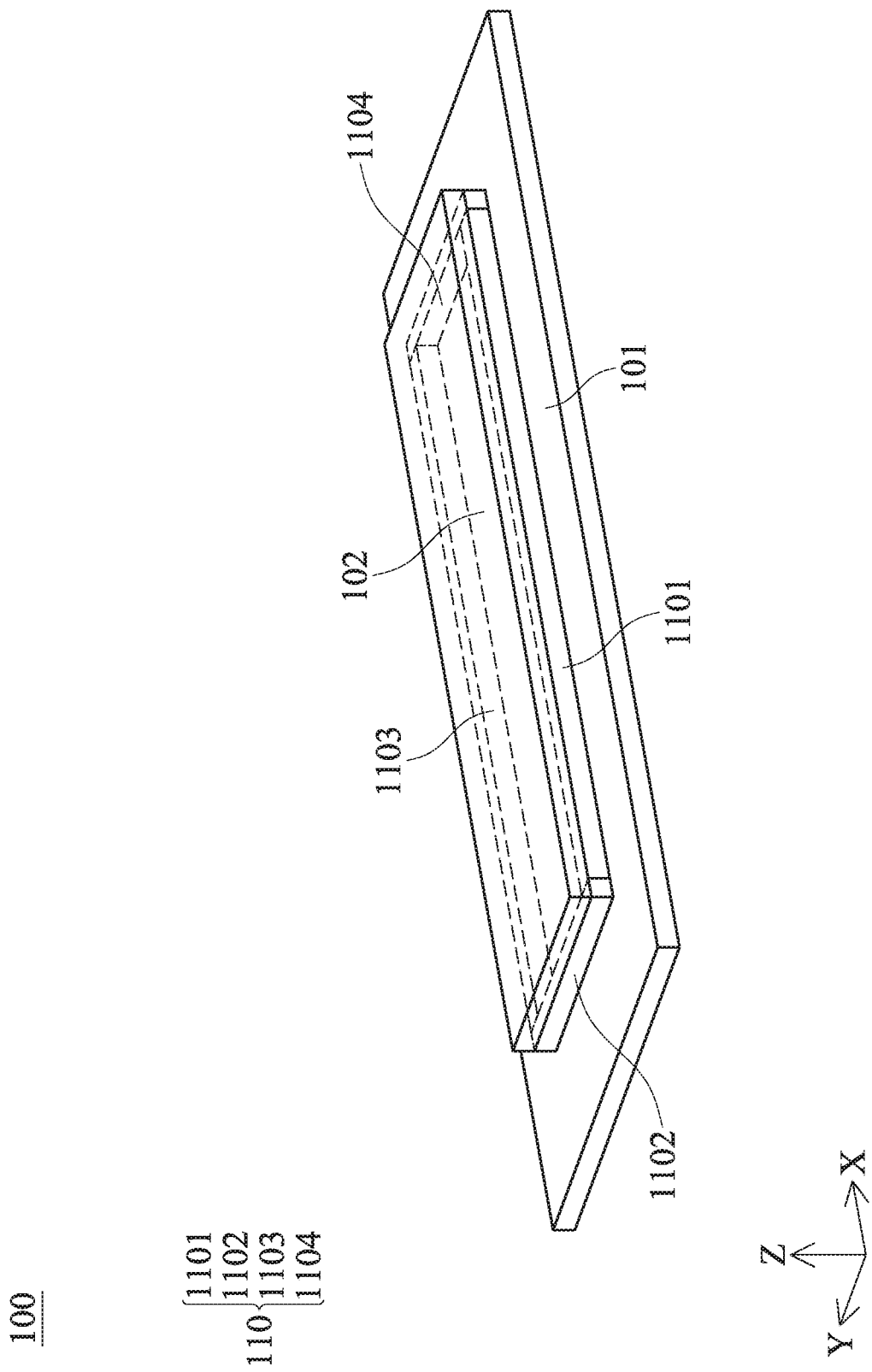
FIG. 6 is a perspective view showing a part of the structure of the fingerprint identification device 100 according to an embodiment of the present disclosure.

Next, please refer to FIG. 2 and FIG. 6. FIG. 6 is a perspective view showing a part of the structure of the fingerprint identification device 100 according to an embodiment of the present disclosure. The second driving assembly 110 of the fingerprint identification device 100 is disposed on the substrate 101, the second driving assembly 110 includes four second driving elements 1101 to 1104 respectively disposed at the four sides of the fingerprint identification sensing component 102, and the second driving elements 1101 to 1104 are disposed between the fingerprint identification sensing component 102 and the substrate 101.

The control circuit 104 can further control at least one of the second driving elements 1101 to 1104 to drive the fingerprint identification sensing component 102 to rotate around the X-axis (the first axis) and/or the Y-axis (the second axis) relative to the substrate 101. For example, please refer to FIG. 7A and FIG. 7B, which are diagrams respectively illustrating that the second driving assembly 110 drives the fingerprint identification sensing component 102 to rotate relative to the X-axis and the Y-axis according to an embodiment of the present disclosure.

Figure 7A:
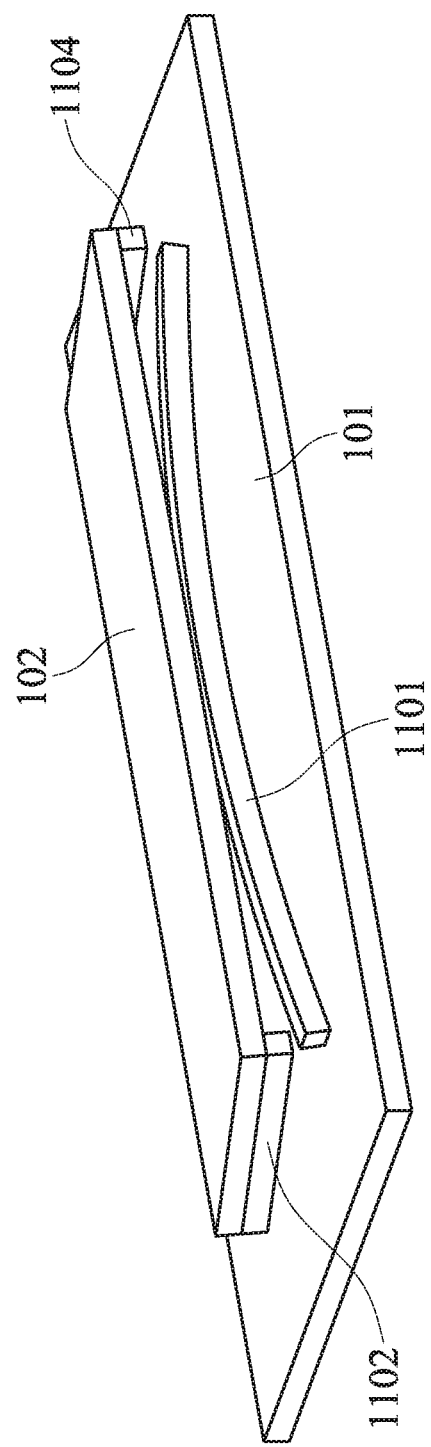
FIG. 7A and FIG. 7B are diagrams respectively illustrating that the second driving assembly 110 drives the fingerprint identification sensing component 102 to rotate relative to the X-axis and the Y-axis according to an embodiment of the present disclosure.
Figure 7B:
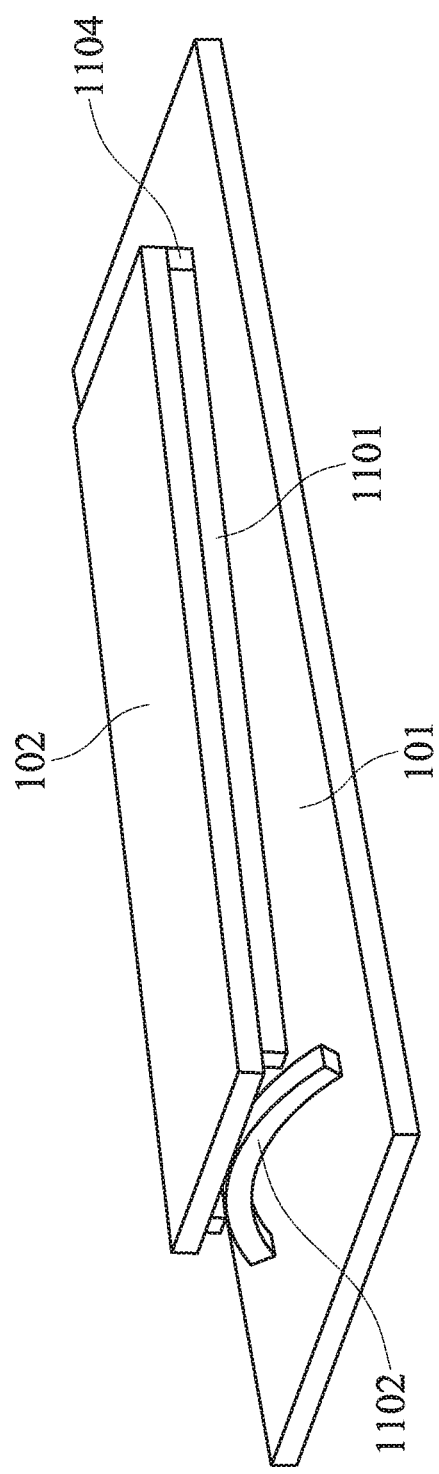

As shown in FIG. 7A, when the second driving element 1101 receives the voltage signal V, a deformation along the Z-axis is generated so as to drive the fingerprint identification sensing component 102 to rotate around the X-axis. Moreover, as shown in FIG. 7B, when the second driving element 1102 receives the voltage signal V, a deformation along the Z-axis is generated so as to drive the fingerprint identification sensing component 102 to rotate around the Y-axis. The way in which the second driving elements 1103, 1104 drive the fingerprint identification sensing component 102 is similar to that of the second driving elements 1101, 1102 and therefore is omitted herein.

In addition, the control circuit 104 can also control the deformation of two second driving elements. For example, the control circuit 104 controls the second driving elements 1101, 1102 to be deformed at the same time, so that the fingerprint identification sensing component 102 rotates around the X axis and the Y axis at the same time.

Figure 8:
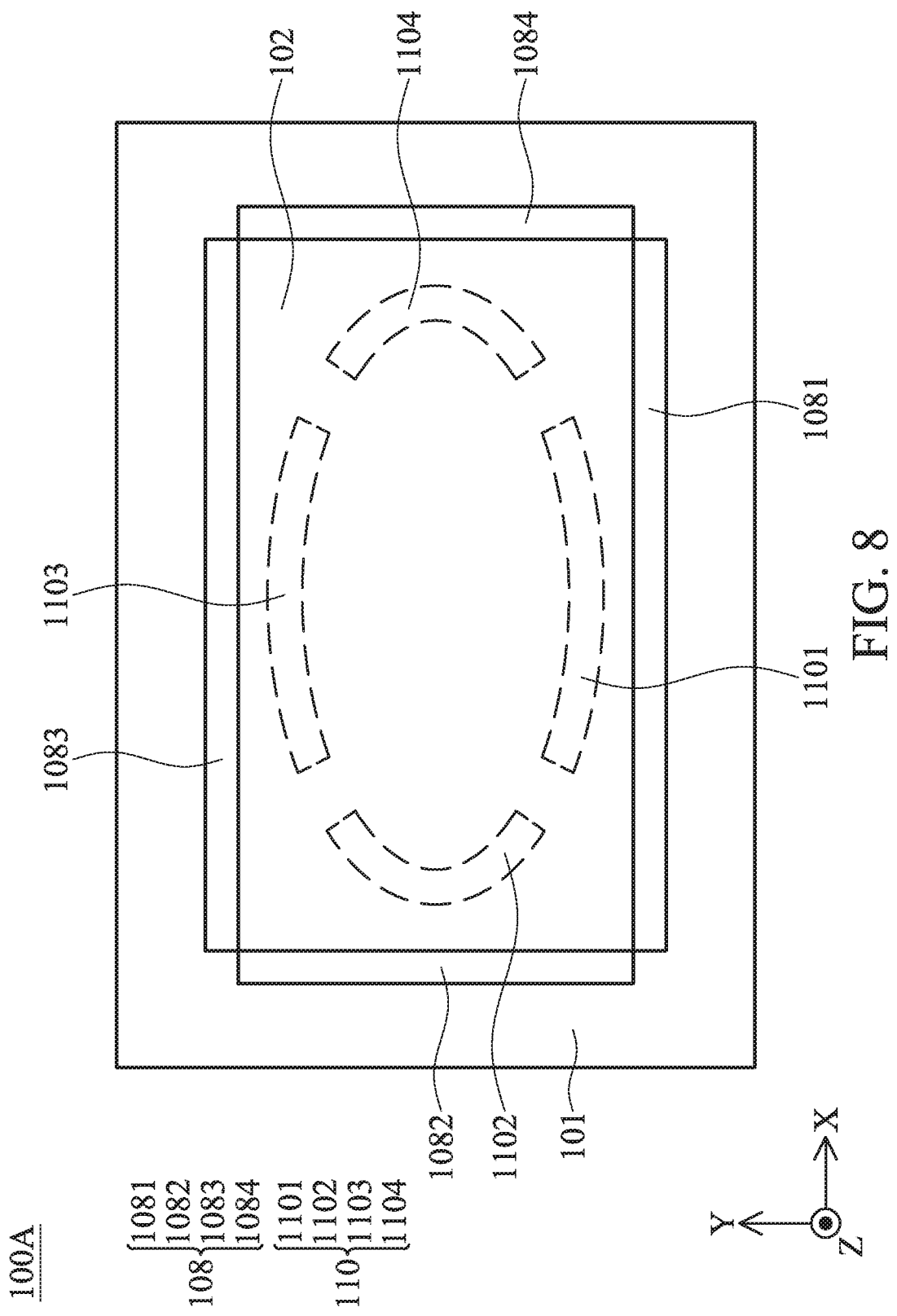
FIG. 8 is a schematic diagram of a fingerprint identification device 100A according to another embodiment of the present disclosure.

Next, please refer to FIG. 8, which is a schematic diagram of a fingerprint identification device 100A according to another embodiment of the present disclosure. The fingerprint identification device 100A is similar to the fingerprint identification device 100. The difference between them is that, in this embodiment, the second driving elements 1101 to 1104 are arranged in a ring structure.

Figure 9:
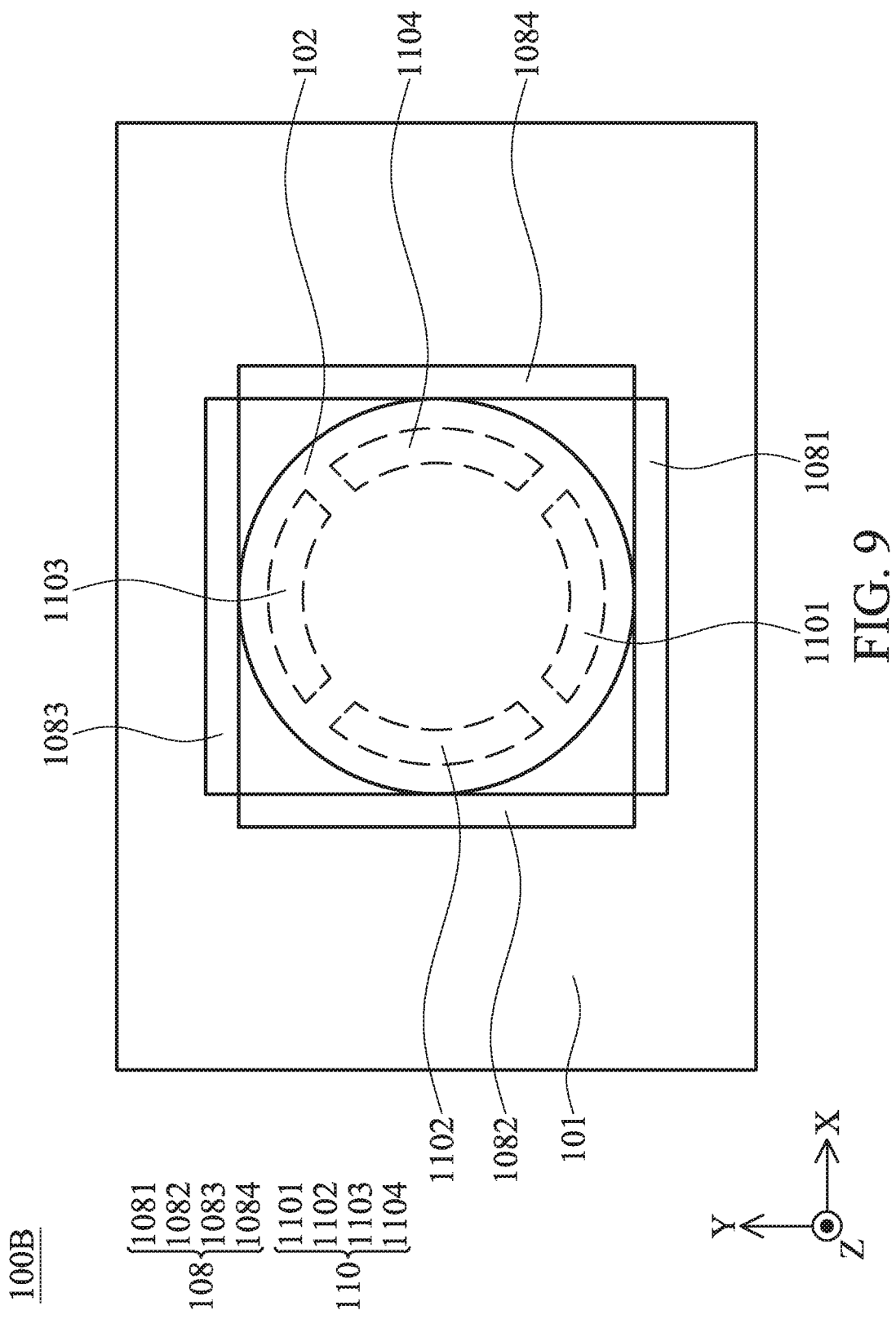
FIG. 9 is a schematic diagram of a fingerprint identification device 100B according to another embodiment of the present disclosure.

Next, please refer to FIG. 9, which is a schematic diagram of a fingerprint identification device 100B according to another embodiment of the present disclosure. The fingerprint identification device 100B is similar to the fingerprint identification device 100A, and the difference between them is that, in this embodiment, the fingerprint identification sensing component 102 has a circular structure.

In this embodiment, the four first driving elements 1081 to 1084 of the first driving assembly 108 are in contact with the fingerprint identification sensing component 102. The first driving elements 1081, 1083 are arranged in the Y-axis (the second axis), the first driving elements 1082, 1084 are arranged in the X-axis (the first axis), and the first axis is substantially perpendicular to the second axis.

It should be noted that the shapes of the fingerprint identification sensing component 102 and the second driving elements can be adjusted according to actual needs. For example, in other embodiments, the fingerprint identification sensing component 102 may also have an oval-shaped structure (or a pill-shaped structure).

Figure 10:
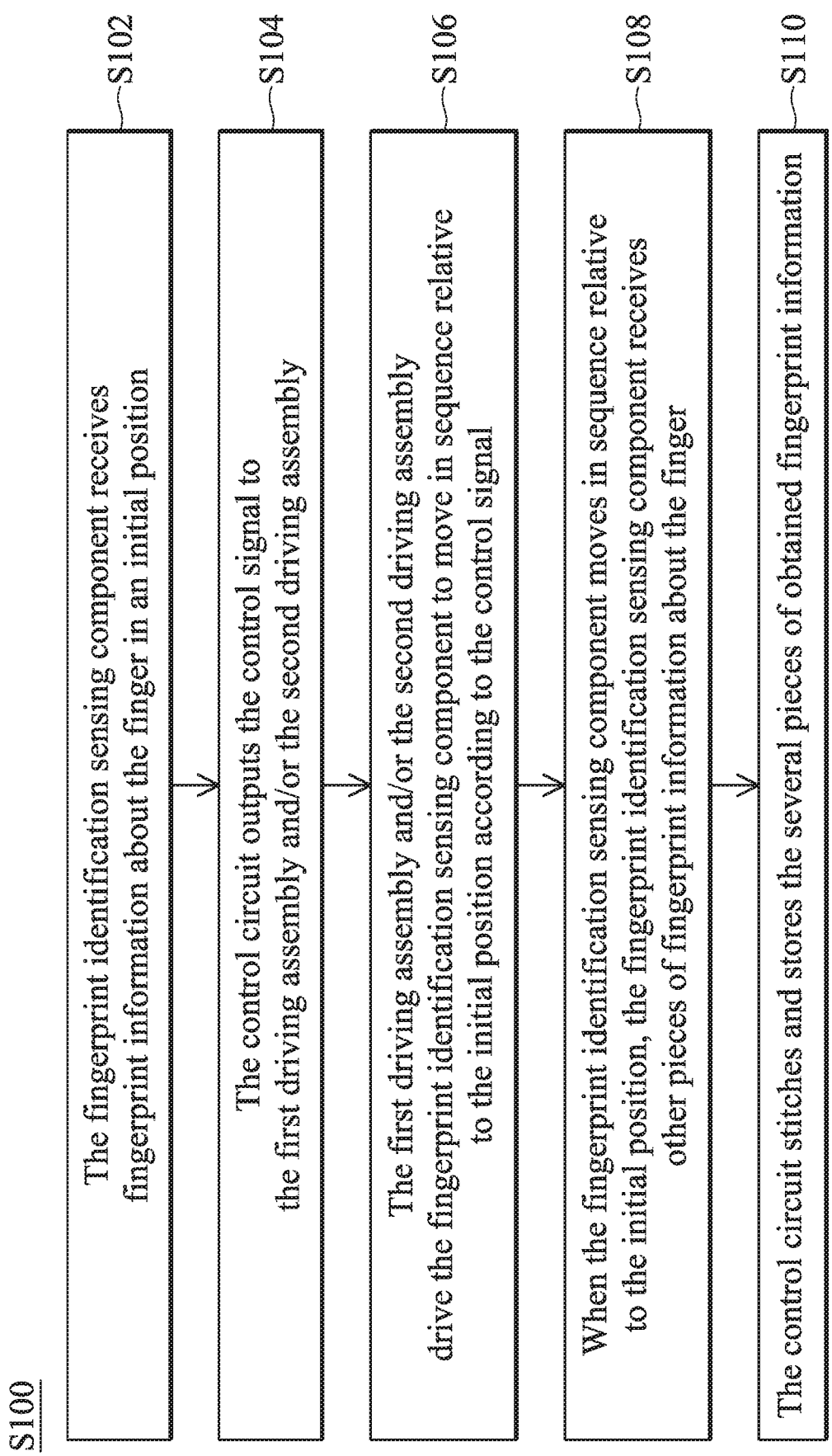
FIG. 10 is a flowchart of a control method S100 of the fingerprint identification device 100 according to an embodiment of the present disclosure.

Please refer to FIG. 10, which is a flowchart of a control method S100 of the fingerprint identification device 100 according to an embodiment of the present disclosure. In step S102, when the user's finger FG is placed on the fingerprint identification device 100, the fingerprint identification sensing component 102 receives the fingerprint information (first fingerprint information) about the finger FG in an initial position, and the initial position of the fingerprint identification sensing component 102 is as shown in FIG. 2 and FIG. 3.

In step S104, the control circuit 104 outputs the control signal to the first driving assembly 108 and/or the second driving assembly 110.

Next, in step S106, the first driving assembly 108 and/or the second driving assembly 110 drive the fingerprint identification sensing component 102 to move in sequence relative to the initial position according to the control signal. For example, the fingerprint identification sensing component 102 can be moved from the initial position illustrated in FIG. 3 to the position shown in FIG. 4A, and then continue to move to the positions illustrated in FIGS. 5A, 4D, 5C, 4B, 5D, 4C, and 5B. That is, the fingerprint identification sensing component 102 is moved in the counterclockwise direction with respect to the initial position, but it is not limited thereto. In other embodiments, the fingerprint identification sensing component 102 may be moved clockwise.

It should be noted that the control circuit 104 can also control the second driving element to be deformed to drive the fingerprint identification sensing component 102 to rotate when it is in the positions illustrated in FIG. 4A to FIG. 5D. For example, in the position illustrated in FIG. 4A, the second driving element 1103 can receive the control signal to be deformed to drive the fingerprint identification sensing component 102 to rotate around the X-axis. Moreover, when in the position shown in FIG. 5A, the second driving elements 1102, 1103 can receive the control signal to be deformed to drive the fingerprint identification sensing component 102 to rotate around the X-axis and the Y-axis. Other techniques of controlling the movement of the fingerprint identification sensing component 102 are similar to the foregoing description, and therefore the details thereof are omitted herein.

In step S108, when the fingerprint identification sensing component 102 moves in sequence relative to the initial position, the fingerprint identification sensing component 102 receives other pieces of fingerprint information (second fingerprint information) about the finger FG. For example, the operation of capturing fingerprint information is performed once in each of the positions shown in FIG. 4A to FIG. 5D.

In step S110, the control circuit 104 stitches and stores the several pieces of obtained fingerprint information (including the first fingerprint information and several pieces of the second fingerprint information) to complete the fingerprint capture step. Then, the control circuit 104 can output the stitched fingerprint information to a processing circuit of the notebook computer 10 through the connection interface 106 so as to perform the fingerprint registration.

The present disclosure provides a fingerprint identification device including at least one driving assembly (the first driving assembly 108 and the second driving assembly 110 described above) which includes a plurality of driving elements (such as the first and second driving elements described above), and the driving element can be a piezoelectric element. When the driving element receives the voltage signal, the driving element can drive the fingerprint identification sensing component 102 to move relative to an initial position, and at the same time, the fingerprint identification sensing component 102 can capture the fingerprint information of the user during said movement.

Based on the design of the present disclosure, the fingerprint identification device can increase the detected fingerprint area, such as the portion of fingerprint on the side of the finger, thereby improving the reliability of the authentication. In addition, the user can complete fingerprint registration in one touch, rather than multiple touches, thereby greatly reducing the time it takes to register a fingerprint.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. A fingerprint identification device, comprising:
   a substrate;
   a fingerprint identification sensor, disposed on the substrate and configured to receive fingerprint information about a finger of a user;
   a first driving assembly, disposed on the substrate; and a control circuit, configured to transmit a control signal to the first driving assembly;

wherein when the finger is placed on the fingerprint identification device, the first driving assembly is configured to deform according to the control signal to drive the fingerprint identification sensor so that the fingerprint identification sensor is sequentially moved relative to the substrate in different directions.

2. The fingerprint identification device as claimed in claim 1, wherein the fingerprint identification sensor has a rectangular structure, and the first driving assembly includes four first driving elements that respectively contact four sides of the fingerprint identification sensor.

3. The fingerprint identification device as claimed in claim 2, wherein the control circuit is configured to control at least one of the first driving elements to drive the fingerprint identification sensor to move in a first axis and/or a second axis relative to the substrate.

4. The fingerprint identification device as claimed in claim 3, wherein sizes of the first driving elements correspond to lengths of the respective sides of the fingerprint identification sensor.

5. The fingerprint identification device as claimed in claim 3, wherein the fingerprint identification device further comprises a second driving assembly disposed on the substrate, the second driving assembly includes four second driving elements respectively corresponding to the four sides of the fingerprint identification sensor, and the second driving elements are disposed between the fingerprint identification sensor and the substrate.

6. The fingerprint identification device as claimed in claim 5, wherein the control circuit further controls at least one of the second driving elements to deform so as to drive the fingerprint identification sensor to rotate around the first axis and/or the second axis relative to the substrate.

7. The fingerprint identification device as claimed in claim 5, wherein the second driving elements are arranged in a ring structure.

8. The fingerprint identification device as claimed in claim 1, wherein the fingerprint identification sensor has a circular structure, the first driving assembly includes four first driving elements which are in contact with the fingerprint identification sensor, wherein two of the first driving elements are arranged in a first axis, the other two first driving elements are arranged in a second axis, and the first axis is substantially perpendicular to the second axis.

9. The fingerprint identification device as claimed in claim 8, wherein the fingerprint identification device further comprises a second driving assembly disposed on the substrate, the second driving assembly includes four second driving elements, and the second driving elements are arranged in a ring structure.

10. The fingerprint identification device as claimed in claim 1, wherein the fingerprint identification sensor has an oval-shaped structure.

11. A fingerprint identification module, comprising:
a substrate;
a fingerprint identification sensor, disposed on the substrate and configured to receive fingerprint information about a finger of a user; and
a driving assembly, disposed on the substrate;
wherein when the finger is placed on the fingerprint identification module, the driving assembly is configured to deform according to a control signal to drive the fingerprint identification sensor so that the fingerprint identification sensor is sequentially moved relative to the substrate in different directions.

12. A control method of a fingerprint identification device, comprising:
when a user's a finger is placed on the fingerprint identification device, receiving, by a fingerprint identification sensor, fingerprint information about the finger, wherein the fingerprint identification sensor is in an initial position;
outputting, by a control circuit, a control signal to a driving assembly;
driving, by the driving assembly, the fingerprint identification sensor to sequentially move relative to the initial position according to the control signal; and
receiving, by the fingerprint identification sensor, other pieces of fingerprint information about the finger when the fingerprint identification sensor sequentially moves relative to the initial position;
wherein the step of driving, by the driving assembly, the fingerprint identification sensor to sequentially move relative to the initial position according to the control signal comprises driving the fingerprint identification sensor by the driving assembly to move relative to the initial position in a first axis and a second axis.

13. The control method as claimed in claim 12, wherein the control method further comprises:
driving the fingerprint identification sensor by the driving assembly to move relative to the initial position in a clockwise direction or a counterclockwise direction.

14. The control method as claimed in claim 13, wherein the control method further comprises:
driving the fingerprint identification sensor to rotate around the first axis and/or the second axis relative to the initial position by another driving assembly.

* * * * *